(12) United States Patent
Eckmayer et al.

(10) Patent No.: US 7,022,358 B2
(45) Date of Patent: Apr. 4, 2006

(54) COLLAGEN MEMBRANE MADE FROM PORCINE SKIN

(75) Inventors: Zdenek Eckmayer, Weinheim (DE); Rainer Dorstewitz, Bensheim (DE); Lothar Schlösser, Darmstadt (DE); Josef Anton Böhni, Neuchatel (CH); Peter Geistlich, Stansstad (CH)

(73) Assignee: ED. Geistlich Sohne AG Fur Chemische Industrie, (CH)

( * ) Notice: Subject to any disclaimer, the term of this patent is extended or adjusted under 35 U.S.C. 154(b) by 67 days.

(21) Appl. No.: 10/281,123

(22) Filed: Oct. 28, 2002

(65) Prior Publication Data

US 2003/0115677 A1    Jun. 26, 2003

Related U.S. Application Data

(62) Division of application No. 09/455,811, filed on Dec. 7, 1999, now Pat. No. 6,482,240.

(51) Int. Cl.
*A23J 1/10* (2006.01)
*A23J 3/04* (2006.01)
*A23L 1/312* (2006.01)

(52) U.S. Cl. .................. 426/92; 426/140; 426/657; 530/356

(58) Field of Classification Search .............. 426/140, 426/657, 92; 530/356
See application file for complete search history.

(56) References Cited

U.S. PATENT DOCUMENTS

| | | | |
|---|---|---|---|
| 2,747,228 A | | 5/1956 | Braun et al. |
| 3,014,024 A | | 12/1961 | Lieberman et al. |
| 3,123,653 A | | 3/1964 | Lieberman |
| 3,529,530 A | | 9/1970 | Tsuzuki |
| 3,535,125 A | | 10/1970 | Fagan |
| 3,664,844 A | * | 5/1972 | Miller .................. 426/32 |
| 3,664,849 A | | 5/1972 | Autry |
| 3,932,676 A | | 1/1976 | Janicki |
| 3,961,085 A | | 6/1976 | Winkler et al. |
| 4,222,741 A | * | 9/1980 | Whitney et al. |
| 4,320,201 A | * | 3/1982 | Berg et al. ............... 435/265 |
| 4,476,072 A | * | 10/1984 | Ariens |
| 5,019,087 A | * | 5/1991 | Nichols |
| 5,028,695 A | * | 7/1991 | Eckmayer et al. ........ 530/356 |
| 5,681,517 A | | 10/1997 | Metzger |

FOREIGN PATENT DOCUMENTS

| | | | |
|---|---|---|---|
| CA | 1 253 387 | | 5/1989 |
| DE | 0482825 | | 9/1929 |
| DE | 0624922 | | 1/1936 |
| DE | 0970263 | | 9/1958 |
| DE | 1213211 | | 11/1962 |
| DE | 1767613 | | 5/1968 |
| DE | 1945527 | | 9/1969 |
| EP | 0258020 | | 3/1988 |
| EP | 0269460 | | 6/1988 |
| EP | 0325151 | | 1/1989 |
| EP | 0709030 | | 10/1995 |
| EP | 0 733 306 | | 9/1996 |
| EP | 0820698 | | 7/1997 |
| EP | 0962146 | | 6/1998 |
| GB | 0824362 | | 11/1959 |
| GB | 1145112 | * | 3/1969 |
| WO | 8802991 | | 5/1988 |
| WO | 9201394 | | 2/1992 |
| WO | WO 95/04102 A1 | | 2/1995 |
| WO | 9517100 | | 6/1995 |

OTHER PUBLICATIONS

WPI Accession No. 1987-261285 & JP 62181741 A published Aug. 10, 1987.
WPI Accession No. 1991-089029 & ES 2017564 A published Feb. 16, 1991.
WPI Accession No. 1997-536572 & CN 1127594 A published Jul. 31, 1996.
WPI Accession No. 1997-236776 & CN 1099580 A published Mar. 8, 1995.
WPI Accession No. 1995-321096 & CN 1094060 A published Oct. 26, 1994.

* cited by examiner

*Primary Examiner*—Arthur L. Corbin
(74) *Attorney, Agent, or Firm*—Rothwell, Figg, Ernst & Manbeck, PC

(57) ABSTRACT

Collagen membranes are formed from porcine rinds (i.e., pig skins) for us in a variety of applications and, most preferably, for wrapping food products, such as hams and the like. First, after removing skins from the porcine, the skins are promptly frozen. In later processing, the rinds are thawed and then enzymatically defatted. Then, a quick alkalinic hydrolyzation is performed on the rinds. Then, an acidic hydrolyzation is performed on the rinds. The rinds are then ground into a gel-like fluid mass. Finally, the fluid mass is extruded, sheeted and dried into a collagen membrane. The collagen membrane produced can be, in preferred embodiments, used for wrapping food products, such as hams.

5 Claims, 1 Drawing Sheet

COLLAGEN MEMBRANE MADE FROM PORCINE SKIN

CROSS-REFERENCE OF RELATED APPLICATION

The present invention is a divisional of U.S. application Ser. No. 09/455,811, filed on Dec. 7, 1999, is now U.S. Pat. No. 6,482,240.

BACKGROUND OF THE INVENTION

1. Field of the Invention

The present invention relates generally to the making of collagen membranes and, more specifically, to the making of edible collagen membranes for wrapping food products, such as hams and the like.

2. Description of the Related Art

Collagen membranes (a.k.a.: films, foils, etc.) are used in variety of applications, such as illustrated in U.S. Pat. No. 5,736,180 (Spice impregnated edible wrapping foil); U.S. Pat. No. 5,520,925 (Material on the basis of collagen fibers for covering wounds); U.S. Pat. No. 5,190,810 (Composite for use in making protective articles for use in laser surgery); U.S. Pat. No. 5,103,816 (Composite for use in making protective articles for use in laser surgery); U.S. Pat. No. 5,028,695 (Process for the manufacture of collagen membranes used for hemostasis, the dressing of wounds and for implants); U.S. Pat. No. 4,131,650 (Collagen foil for cosmetic application).

As illustrated in the above-listed '180 patent, some edible collagen foils are known for, among other uses, wrapping food products, such as hams.

Collagen foils can be made from a variety of animal skins. However, making collagen foils from porcine skins (i.e., pig skins) presents a number of unique problems over making such from, for example, cattle or bovine. For instance, problems result from the need to remove the porcine hair and to handle the high fat content of porcine skins.

Currently, there are some procedures for preparing collagen foils from porcine skins, but these procedures are not satisfactory for the preparation of food products and the like from the collagen foil produced. The existing procedures focus on the preparation of the porcine skins for the creation of "leather" goods that are processed at tanneries or the like.

Currently, collagen foils are prepared from porcine skins as set forth in paragraphs (a)–(c) below. The present invention is a great advancement over existing procedures. Specifically, existing procedures utilize the following steps:

(a) Porcine skins are collected from an abattoir (i.e., an establishment for slaughtering) and are usually preserved with sodium chloride and sold via skin traders to tanneries (i.e., establishments for converting skins into leather). At the tanneries, the goods are first washed with water and wetting agents and, if necessary, enzymes are also used to remove adhering feces and sodium chloride. During additional steps, hair is removed from the skins using sodium sulfide and lime and, if necessary, using enzymes and lubricants. As a result, the skins (which are alkalinic) are swollen to approximately 5–10 mm thick.

(b) To further process the skins into leather, the skins are horizontally "split" into two layers. The lower layer, i.e., that which is directed toward the animals's body, serves as the starting material for the manufacture of collagen foils. Depending upon the tannery, as an intermediate step, the material can often be stored for an indefinite period in hygienically uncontrolled conditions.

(c) The "splits" are then subjected to a solution of caustic soda and/or lime in an alkalinic hydrolyzation process that can last for up to about 15 days. Through the hydrolyzation process, the material becomes prepared for additional steps, particularly mincing. Due to the molecular characteristics of the bovine skin collagen used (reticular network), hydrolyzation processes ranging from intense to aggressive are required. After the alkalinic hydrolyzation, the splits are brought to a pH<3.5, after having first undergone a strong acidic treatment, e.g., with hydrochloric acid, and then they are ground to a gel-like mass. Or, after alkalinic treatment, the skins are brought to a pH of 5–7 using organic or inorganic acids, ground to a fibrous pulp, and then brought to a pH of <3.5. The fluid pulp, which contains less than 2.5% collagen, and to which other materials, such as glycerin, Karion® (sorbitol), and cross linking agents have been added, is extruded and dried in a band dryer to the foil.

The above-described procedures have significant disadvantages. Overall, the present inventors have found that the foregoing procedures are not satisfactory for foodstuffs and the like. The present inventors have noted that the foregoing procedures have, for example, the following particular disadvantages:

The preserving salts can have additives that should not appear in food.

The skins are not cleaned and are stored with fecal contamination.

The goods can be of questionable origin (i.e., in the trade of skins, there are also goods of questionable origin, such as, e.g., skins from knackeries).

The processing in the tannery is based on the requirements for leather production using technical chemicals.

The product is transported in a non-refrigerated state to the foil manufacturers. As a result, in the warmer seasons, there is the potential for increased bacterial contamination. This contamination can even be substantial enough to cause partial putrefaction of the material delivered. The alkaline product can also potentially undergo uncontrolled chemical decomposition, depending on the conditions of temperature and the time interval between the splitting and the delivery to the foil manufacturers.

The raw material for the foils is subjected to extreme deviations in quality due to the complex series of events that take place.

The aggressive alkalinic treatment (hydrolyzation) also leads to denaturing alterations in the collagen.

SUMMARY OF THE INVENTION

In view of the foregoing problems in the existing art, the present invention was created by the present inventors to overcome the above-noted and other problems in the making of collagen membranes, and especially in the making of edible collagen membranes made from porcine skins (a.k.a.: pig skins or pork rinds).

The present invention provides, among other things: a) a novel method for making a collagen membrane; b) a novel collagen membrane made by the method; and c) a novel method of using the collagen membrane.

According to a first aspect of the invention, a method of making a collagen membrane from a porcine rind is provided which includes the steps of: removing skins from the porcine and promptly freezing the removed skins for processing; enzymatically defatting the rinds; performing a quick alkalinic hydrolyzation on the rinds; performing an acidic hydrolyzation on the rinds; grinding the rinds into a gel-like fluid mass; and extruding, sheeting and drying the gel-like mass into a collagen membrane.

According to another aspect of the invention, a collagen membrane is made by the method of the first aspect of the invention. In one preferred embodiment, the collagen membrane is wrapped around a food product, such as a ham.

The above and other aspects, features and advantages of the invention will be further understood based on the following description of the preferred embodiments in combination with the accompanying drawings and claims.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENTS

Figure 1:
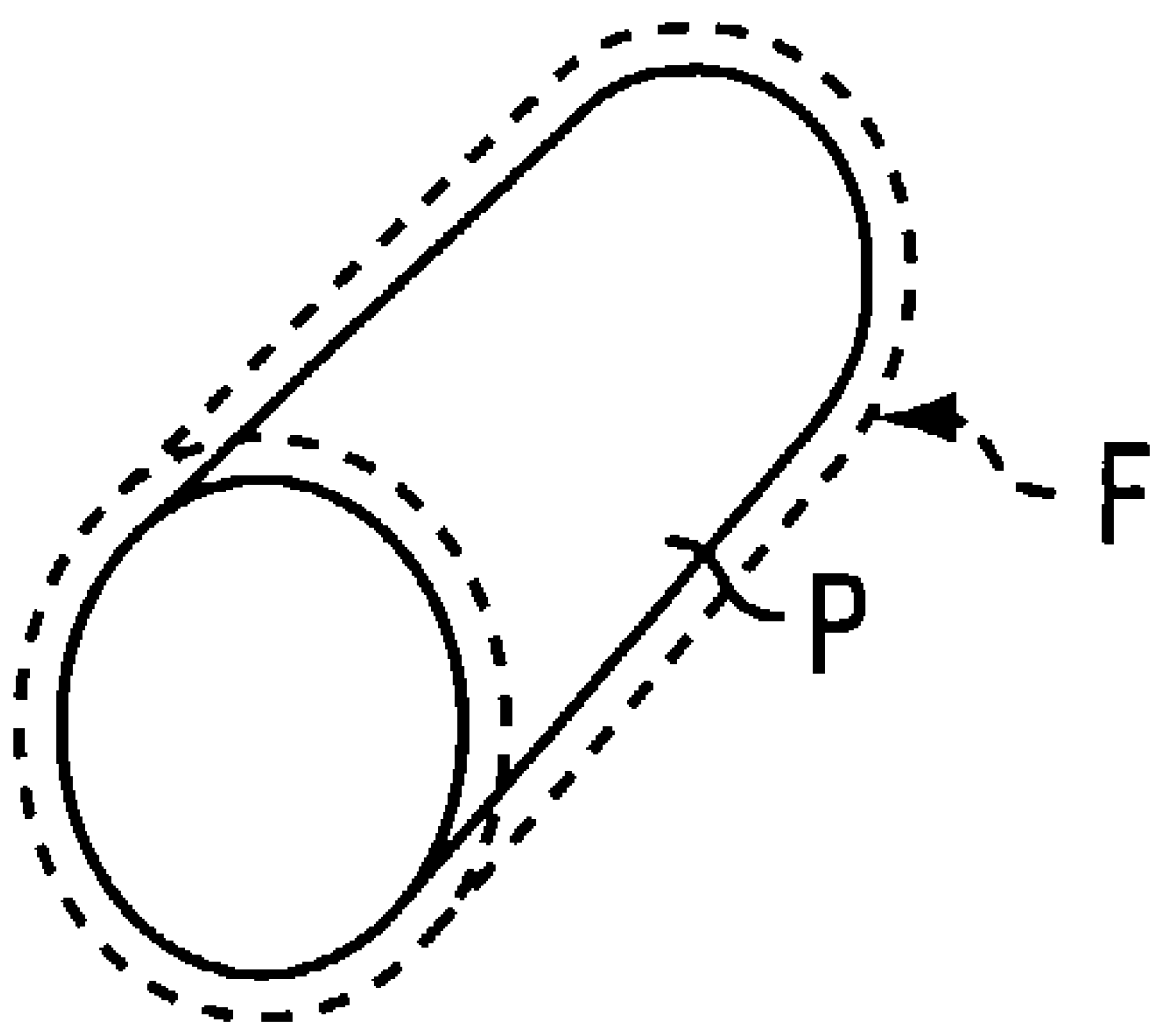
FIG. 1 is a schematic diagram showing the finished foil on a product, such as a ham or other meat product.

As noted above, the present invention provides, among other things: a) a novel method for making a collagen membrane; b) a novel collagen membrane made by the method; and c) a novel method of using the collagen membrane.

The Method of Making the Product

The first aspect of the present invention involves a novel method of making a collagen membrane (which may also be referred to as collagen foil, film, etc.). In summary according to a first embodiment, the method preferably includes the following general method steps (sequence of the steps could change):

(a) collecting/freezing of the rinds
(b) defatting
(c) dehairing/alkalinic treatment
(d) acidic treatment
(e) forming into a gel-like mass
(f) extruding/drying (a) Immediately after removing the porcine rinds at the abattoir (i.e., promptly upon removing (e.g., skinning) the rinds from the hogs at the abattoir's establishment), the rinds are washed with cold or hot water and dehaired. After this the rinds are promptly frozen for use as a starting material for the collagen membrane process. Preferably, the rinds are quickly frozen while in a very clean condition and, thus, preserved for use. A variety of freezing techniques can be employed, such as, for example, subjecting the rinds to a −50° C. quick freezer or to a normal freezer at −18 to −28° C. It is also possible to subject the rinds to dry ice or liquid nitrogen. It is also possible to start the process directly with fresh, unfrozen rinds.

Preferably, the rinds are maintained in such a frozen state until the rinds are subsequently processed as discussed below. In this regard, the subsequent processing steps are typically conducted at a different location than the establishment of the abattoir and, thus, the rinds are also preferably transported in this frozen state. For the subsequent processing in steps, step (b) et seq, discussed below, the frozen rinds should preferably be thawed out to facilitate such processing;

(b) In the subsequent processing, the rinds are defatted in one or more steps. this defatting is preferably carried out enzymatically with the help of wetting agents (e.g., detergents). Before starting the chemical process, it is also possible to defatt the rinds mechanically (removing of fat over 15% of initial fat content). Also the defatting with water and surfactant or with organic solvents is possible.

(c) Then the alkalinic treatment is performed with alkalinic reacting organic or inorganic agents. This treatment could be combined with the removal of the porcine bristles. Strong alkalinic reagents such as sodium hydroxide or potassium hydroxide are able to dissolve the bristles and soften the collagen fiber structure. Also anorganic or organic reducing agents like sulfides (e.g., sodium sulfide, potassium sulfide) or thio compounds (e.g., thioalcoholes, thiourea, thioglycol) are able to dissolve the bristles.

(d) With acidic agents, the rinds are brought to a maximum pH of 4.0 with inorganic (e.g., hydrochloric acid, sulfuric acid, phosphoric acid) or organic acids (e.g., lactic acid, citric acid, formic acid, acetic acid). During this treatment the rinds take up water (swell). This is important for the transformation of the rinds into a gel-like mass. It is also possible to neutralize with acidic reacting agents to a pH 4–8, most preferably pH 5–7. The resulting deswollen material could be milled into a fiber slurry. Later this slurry is acidified to pH<4 to get the gel like mass.

(e) The swollen rinds are ground into a gel-like mass. It is also possible to ground unswollen rinds at pH>4.0 into a collagen slurry and perform the acidification into the gel-like mass in a subsequent processing.

(f) Then the fluid mass is treated with known extrusion and drying steps that are analogous to those of prior art procedures utilized with bovine skins, as discussed herein and above.

The method of the present invention has substantial advantages over the existing procedures. Some exemplary advantages include that:

1. Step (a) of the present method can advantageously
   Provide a product that is appropriate for foodstuffs;
   Provide a starting material for the films that has a consistently high quality;
   Avoid raw material of non foodstuff sources;
   Avoid burdening or contamination of the raw material with chemicals;
   Avoid burdening or contamination of the raw material with microbiological contaminants;
   Avoid uncontrolled chemical decomposition of the raw material; and
   Avoid uncontrolled microbiological decomposition of the raw material.

2. In step (b) through (e), both the high fat content as well as the comparatively non-aggressive alkaline treatment can also prevent denaturating alterations in the collagen. Also moderate temperatures and non-aggressive bleaching steps save the collagen. With such a resulting collagen material it is possible to reduce or to avoid crosslinking agents in the final product. In contrast, degraded collagen requires the use of crosslinking agents to get the desired tensile strength.

The method according to the first aspect of the invention can include, in the following illustrative and non-limiting examples, features as set forth in greater detail as described herein and as schematically shown in the figures. The illustrative cases are based on exemplary embodiments that have been produced.

In these exemplary embodiments, the treatment of the porcine skins after the above noted step (a) can include the specific procedural steps described below. (In the following description, the percentages are in relation to the weight of the rinds (i.e., the weight of the rinds=100%) and the "mixer" used was a stainless steel reaction vessel.)

EXAMPLE 1

Step I: (Defatting)

In a first step (following collection and freezing), the very fatty rinds are defatted. This defatting step is preferably carried out enzymatically with the help of wetting agents (e.g., detergents). Preferably lipases are used to hydrolyze natural fat between the collagen fibers. In addition, proteases are preferably used to support this action (i.e., to provide a more uniform defatting). In addition, a surfactant is preferably used to emulsify the released fatty acids. The combination of chemical and biochemical agents in this first step, and the advantages therefrom, were not previously contemplated in the field of preparing edible foils or films.

In a specific non-limiting example, this defatting can be carried out as follows (i.e., it should be understood that this is an exemplary embodiment and can be varied by those in the art depending on circumstances as appropriate (most preferable values in parenthesis):

| Temperature: 10–35° C. (30° C.) | | | |
|---|---|---|---|
| pH 7–11 (9–10) | | | |
| (i) | Place the following into the mixer | | |
| | Rinds | 100% | |
| | Water | 50–150% | (100%) |
| | Sodium carbonate | 0–5% | (3%) |
| | Fat dissolving enzymes (lipases) | 0–2% | (0.6%) |
| | Protein dissolving enzymes (proteases) | 0–2% | (0.5%) |
| (ii) | Treatment in the mixer: | 30 min–3 h | (1 hour) |
| (iii) | Add to the above in the mixer | | |
| | Surfactant | 0.05–3% | (0.5%) |
| (iv) | Treatment time in the mixer: | 30 min–5 h | (2 hours) |
| (v) | Rinse: | | |
| Drain the water and dissolved chemicals from the mixer (e.g., via a drain). | | | |

Step II: (Alkalinic Treatment/Dehairing (i.e., the Removal of the Porcine Bristles)

In a second step, hair (e.g., roots within the skin) is removed from the porcine rinds. The presence of this hair is a problem particularly to porcine skins. In this "hair-removal" step, a combination of chemical, which preferably includes sodium sulfide, is used to dissolve this undesired hair or bristle material. This step and the advantages therefrom are also unknown in the field of edible foils. Normally this dehairing step of bovine skin takes place in tanneries under technical conditions. The use of the sulfide dehairing of porcine rinds under foodstuff conditions is novel.

In a specific non-limiting example, this dehairing can be carried out as follows (most preferable values in parenthesis):

| Temperature: 10–35° C. (30° C.) | | | |
|---|---|---|---|
| pH > 9 (>12) | | | |
| (i) | Place in mixer: | | |
| | Lime | 0.5–5% | (3%) |
| | Water | 20–50% | (30%) |
| | Sodium sulfide | 2–6% | (4%) |
| (ii) | Treatment time in mixer: | 2–8 h | (5.5 hours) |
| (iii) | Add in mixer: | | |
| | Water | rest to 100% | (70%) |
| (iv) | Treatment time in mixer: | 5–30 min | (10 minutes) |
| (v) | Rinse: | | |
| Drain the water and dissolved chemicals from the mixer. | | | |

Alternatively, sodium sulfide other inorganic or organic reducing agents like potassium sulfide or thio compounds e.g., thiolcoholes, thiourea, thioglycol are able to dissolve the bristles. The lime/reducing agent could also be replaced by strong alkali e.g., sodium hydroxide or potassium hydroxide alone, to remove the bristles.

Step III: (Washing)

Then, the porcine skins are preferably subjected to a washing step. In a specific non-limiting example, the washing step can be carried out as follows (most preferable values in parenthesis):

| Temperature: 10–35° C. (30° C.) | | | |
|---|---|---|---|
| (i) | Place in mixer: | | |
| | Water | 50–200% | (100%) |
| (ii) | Treatment time in mixer: | 5–30 min | (10 minutes) |
| (iii) | Rinse: | | |
| Drain the water and dissolved chemicals from the mixer. | | | |

Step IV: (Cleaning and Opening Up)

In a subsequent preferred step, the rinds are cleaned, preferably with peroxide to bleach the rinds. Preferably, sodium hydroxide is used so as to provide an alkaline condition that is for better peroxide action.

The sodium hydroxide also "opens-up" the collagen structure—i.e., provides the first step of collagen fiber separation. While sodium hydroxide is used in prior art collagen processing, "opening-up" of bovine rinds requires higher concentrations of sodium hydroxide and especially longer time periods than with porcine rinds. The collagen of bovine rinds is more crosslinked, and the material is harder and needs a stronger hydrolyzation to "open-up" than does porcine rinds. For example, porcine rinds in the present invention can be processed with 0.3–0.8% sodium hydroxide for 1–2 hours. Bovine rinds need 1–1.5% sodium hydroxide for 12–24 hours or a lime suspension for at least 15 days.

In a specific non-limiting example, this step can be carried out as follows (most preferable values in parenthesis):

| Temperature: 10–35° C. (30° C.) | | | |
|---|---|---|---|
| pH 8–13 (9–11) | | | |
| (i) | Place in mixer: | | |
| | Water | 50–200% | (100%) |
| | Hydrogen peroxide (33–35%) | 0–2% | (1%) |
| | Sodium hydroxide | 0.3–0.8% | (0.6%) |
| (ii) | Treatment time in mixer: | 1–2 h | (1 hour) |
| (iii) | Rinse: | | |
| Drain the water and dissolved chemicals from the mixer. | | | |

Step V: (Further Washing)

The porcine skins are preferably then subjected to a further washing step. In a specific non-limiting example, the further washing step can be carried out as follows (most preferable values in parenthesis):

| Temperature: 10–35° C. (30° C.) | | | |
|---|---|---|---|
| (i) | Place in mixer: | | |
| | Water | 50–200% | (100%) |
| (ii) | Treatment time in mixer: | 5–40 min | (20 minutes) |
| (iii) | Rinse: | | |
| | Drain the water and dissolved chemicals from the mixer. | | |

Step VI: (Acidification)

Following the above-described alkaline treatment and preferably at this point, a short acidic treatment is conducted. In this step, additional opening-up is carried out—specifically, hydrolyzation of acid unstable crosslinks takes place, dissolving acid soluble non-collagenous material in the rinds.

In a specific non-limiting example, the acidification can be carried out as follows (most preferable values in parenthesis):

| Temperature: 10–35° C. (30° C.) | | | |
|---|---|---|---|
| pH max. 3.5 | | | |
| (i) | Place in mixer: | | |
| | Water | 30–150% | (70%) |
| | Hydrochloric acid (31–33%) | 2.5–10% | (7%) |
| (ii) | Treatment time in mixer: | 15 min.–5 h | (2 hours) |
| (iii) | Rinse: | | |
| | Drain the water and dissolved chemicals from the mixer. | | |

Other possible acids: sulfuric acid, phosphoric acid or organic acids, e.g., lactic acid, citric acid, formic acid, acetic acid. Time consumption for this step: 15 minutes to 5 hours.

Step VII: (Additional Washing)

The porcine skins then are preferably subjected to an additional washing step. In a specific non-limiting example, this washing step can be carried out as follows (most preferable values in parenthesis):

| Temperature: 30° C. | | | |
|---|---|---|---|
| (i) | Place in mixer: | | |
| | Water | 50–200% | (100%) |
| (ii) | Treatment time in mixer: | 5–40 min. | (20 minutes) |
| (iii) | Rinse: | | |
| | Drain the water and dissolved chemicals from the mixer. | | |

(iv) Repeat steps (i) to (iii) until a pH of about 1.8–3.9 is achieved. In this manner, by increasing the pH, the collagen takes up water. Thus, the "water filled" material can be ground as follows directly into a gel-like mass.

After this step, the washed rinds preferably have a pH of about 2.5 and a collagen content of about 13–21%.

Another way is a neutralization instead of acidification. The material is ground into a collagen slurry which is then acidified into a gel-like mass (see Example 2).

Step VIII: (Grinding)

The washed rinds are preferably ground into a uniform gel-like mass. While grinding of skins to a gel-like mass is previously known in collagen processing, for improve grinding, the size is preferably reduced in at least three stages. In this manner, the collagen fiber can be much better protected than in comparison to the same size reduction using only, e.g., two stages. Notably, only the small collagen particle masses don't separate by the addition of water.

In a specific non-limiting example, the grinding step can be carried out as follows:

1. Dividing the rinds into approximately cubic centermeter pieces by mincing through plates with 10 mm holes or by chopping with blades.
2. Then, dividing the pieces into small pieces of approximately a few millimeter in diameter by mincing or pressing the material through a plate with 4 mm holes.
3. Then, grinding to <1 mm by pressing through <1 mm hole plates or with the aid of a colloid mill or with the aid of a homogenizer.

During these procedures additional water or ice may be added.

Step IX: (Preparation of the Fluid Mass)

In a further step, the mass is preferably mixed with water and softener. A part of the water may be ice.

The softener includes for example dialcohols, trialcohols, polyalcohols, (e.g., glycerol) or polymer sugars (e.g., Sorbitol and Karion).

The collagen preparation procedure is very protective for the collagen. Therefore and importantly, the inventive collagen membrane normally needs no crosslinking agents for stabilization and improvement of mechanical properties.

However, if desired, the following chemicals could act as crosslinkers: Organic crosslinkers, e.g., di-aldehydes, $\alpha$-hydroxyaldehydes, di-isocyanates, bisacrylamides, acrolein, carbodimides, anhydrides, diene, polyene; and inorganic crosslinkers, e.g., aluminum compounds. For application in the mass, water soluble and slow reactive compounds (e.g., di-aldehydes, $\alpha$-hydroxyaldhydes) are best. The water insoluble fast reactive compounds should only be applied to the dry foil.

In one exemplary non-limiting case, the values of the fluid mass can be about (most preferable values in parenthesis):

| Collagen content: | 1–25% | (1.8%) |
|---|---|---|
| Glycerol: | 0–1% | (0.5%) |
| Sorbitol: | 0–1% | (0.2%) |
| pH: | 2–3.6 | (2.5%) |
| Temperature: | 3–18° C. | (8° C.). |

With respect to softening, it is noted that pure and dry collagen films are brittle. The step of softening creates collagen fiber separation to allow, e.g., fibers to easily change their positions with adjacent fibers. In this regard, water is about the best softener for collagen. The above mentioned softeners act indirectly—that is, they are very hygroscopic and keep water in the collagen. However, these carbohydrates also have a significant disadvantage—that is, they support microbiological growth because they are a good available carbon source.

While fats are direct and good softeners, covering the dry collagen foil with fats is not very effective. When that is done, the fats are incorporated only between the fibers and not inside the fibers. Adding fat-emulsions into the collagen mass achieves better results, but this also has two disadvantages:

1) emulsifying agents are present in the collagen foil; and
2) the fat can migrate to the surface of the collagen foil because it is not fixed properly.

In preferred embodiments, non-removed natural fat is the best softener. This fat is well incorporated between and inside the fibers. Preferably, in the present method, the chemical process is adapted such that it does not remove all of the fat. The remaining fat, thus, is used as a softener and only a small amount—or even no—additional carbohydrate softener is needed. In comparison to other processes, the present invention is thus advantageous in working with fatty porcine rinds.

The removing of fat in the defatting step(s) depends on the:
  temperature
  pH
  time
  amount of lipase
  amount of surfactant
  amount of defatting steps
  position in the process Defatting is best done at a higher temperature (about 30° C.), at pH 9–10, over extended time periods (up to e.g., 6 hours), with higher amounts of lipase (up to 1%), higher amounts of surfactant (up to 3%), more defatting steps (up to 5 or more over the whole procedure) and later in the process, e.g., after the alkalinic treatment. The content of non-removed fat can be in the range of 0–10%, (dry weight of the foil).

With respect to crosslinking agents, it is noted that only natural unaffected collagen shows the best mechanical properties. With prior art procedures, high amounts of crosslinking agents are necessary after the normally strong alkaline processes in the chemical treatment (i.e., the hydrolysis of the collagen molecules). The crosslinking agents are used to synthetically reconstruct bigger molecules. With the present method, the collagen molecules can be protected and the amount of crosslinking agents can be kept to a minimum.

Step XII: (Homogenization)

After the foregoing, a homogenization step is preferably performed. First, air bubbles are removed, then the slurry is passed to a homogenizer, and then the material is pumped into stainless steel vessels.

A chemical importance of homogenization is that it facilitates the uniform distribution of the water. Homogenization is the final step of reducing the size of collagen particles: fiber bundles and bigger particles are divided into fibers and fibrils. Preferably, the homogenization fulfills at least one, most preferably all, of the following:
  1) it does not affecting the fibre/fibril length;
  2) it maximizes disintegration of fiber bundles into fibers/fibrils; and/or
  3) it has a suitable fibers/fibrils relationship.

The above three points directly and strongly influence the mechanical properties of the collagen foil.

While disintegration steps are well known in collagen processing, the present method has not previously been contemplated by those in the art. The present invention can utilize a conventional homogenizer or a colloid mill. The homogenization step can be carried out with the same machines as the grinding step described above. However, in homogenization, the mass of material being homogenized has the final composition (water content, collagen content, softener content, pH, temperature), where as the above-described grinding step is before the final adjusting of these parameters. Thus, during the homogenization step, the material is ground to less than 1 mm, for example by pressing through plates having holes less than 1 mm therein, or with the aide of a colloid mill or homogenizer.

Step XIII: (Extrusion, Sheeting And Drying)

Then, the slurry preferably undergoes the steps of extrusion, sheeting and drying. In this regard, the slurry is preferably first directed through a slit extruder. The extruded slurry passing through the extruder is received on a conveyor belt. The slurry is preferably sheeted (e.g., with a sheeting roller). The extruded slurry is also preferably neutralized (e.g., directly thereafter the extruder). Neutralization is preferably performed with ammonium gas, or with sodiumhydrogencarbonate, or with other neutralization agents. It is noted that prior to entering the extruder, the slurry has a pH of about 2.0–3.6. At that pH level, the collagen particles are swollen (i.e., they have a high water content). This high water content typically leads to a deformation of the collagen on every level (e.g., molecules, microfibrils, elementary fibers, fibers). A direct drying of the slurry without neutralization can lead to a fixation of these deformations, such that the interaction of the collagen molecules is limited and the foil strength is weakened. Thus, as per the foregoing, after extrusion and before drying, a fiber formation step is preferably performed. This fiber formation step can involve neutralization to higher pH values, as per the above, or a coagulation with high ionic strength solutions.

The chemicals used for this fiber formation and the time offered for fiber formation can influence the properties of the collagen foil. Ammonium gas, noted above, acts very quickly and, thus, may have some disadvantages in good fiber formation. Sodiumhydrogencarbonate, also noted above, acts slowly, and, in consequence, the fiber formation and the mechanical properties of the collagen foil can be improved. Prior to the present invention, it was not previously contemplated to use of sodiumhydrogencarbonate in this context in collagen processing.

The conveyor belt then preferably passes through a dryer. In the dryer, the neutralized slurry is preferably continuously air dried on the belt at about 60–90° C. Length of the dryer can be, as just one non-limiting example, about 50 meters. The conveyor speed (e.g., the production speed) should be made to correspond to the length of the dryer. In one non-limiting example, when the length of the dryer is about 50 meters, the conveyor speed (e.g., directly related to the output of the collagen foil) can be about 3–9 meters per minute. Preferably, the crosswise width of the foil on the conveyor is up to about 60 cm (but, this size can be varied depending on circumstances).

The present invention for producing collagen film from porcine rinds differs substantially from the prior art, which utilizes dehaired bovine splits having a very low fat content, collected from tanneries. Thus, the problems associated with the present invention, i.e., defatting of the very fatty material and removing of the bristles, are unknown in the prior art field of collagen film producers. The present collagen process protects the collagen, therefore it is possible to produce the collagen film without crosslinking agents. The strong process used for bovine splits weakens the material, then it is necessary to stabilize the foil with crosslinking agents. To use no crosslinker is unknown in this art. Both the affected bovine collagen and the crosslinking leads to a collagen film with bad stretchability. On the other hand, high stretchability is an important quality criteria. Fat can improve the stretchability. For example, DE 196 40 019 A1 describes the addition of fat into a mass to get a better stretchable collagen film. With the present invention, porcine fat in the porcine rinds leads to a collagen foil with very good stretching properties.

Step XIV: (Storage)

Then, a final storage, e.g., packaging, step is performed. Prior to packaging, the collagen foil is preferably air-conditioned (dried). Before packaging, the humidity (moisture content) of the collagen film should be within the range of about 5–25%, more preferably about 10–20%, and most preferably between about 11–18% (the humidity level is related, for example, to the softening step and to the present air-conditioning step). Among other things, this preferred humidity range helps provide collagen foils that are better in use. In this regard, humidity levels below about 15% can make the collagen films too brittle, while humidity levels above about 20% can support excess microbiological growth. The product may have a thickness in the range of about 0.01–2 mm, and a dry weight per square meter of about 10–50 g/m².

The Product and its Use

As discussed herein-above, the product (i.e., the collagen foil) produced by the process of the present invention has a number of substantial advantages over existing collagen foils produced by the existing procedures. These advantages can include, for example, that:

From the time of slaughtering, the microorganism count can be minimized, and there can be substantially no increase in the microorganism count. The present foil can be made free of pyrogens and other metabolic products of microorganisms.

The new foil can display a higher natural fat content. The foil can, thus, be less absorbent for water and also more elastic. The foil can, thus, require less— or even no—chemical emollients. In addition, the reduced water absorbency can improve the foil's malleability.

The product of the present invention can also have a better native structure.

The foil can be more elastic as well as more stable, and can only need minimal treatment—or even no treatment—with chemical cross-linking agents.

The present product (due to the gentler manufacturing process) can have a higher isoelectric point, which reduces the aqueous uptake in the neutral range. The foil, thus, remains more stable and is more malleable.

As described herein-above, the present product has substantial benefits in applications where the collagen foil is used with food stuffs or where the requirements for such collagen foil are similar to that of edible foils (e.g., where reduced contamination is desired). In the more preferred embodiments, as shown in FIG. 1, the present foil F is used in methods of wrapping food products P. Most preferably, the present product is used in methods of wrapping meats and the like food products. In a very most preferred embodiment, the foil is used to wrap "hams." As noted below, it should be understood by those in the art that the present invention has a variety of benefits and uses that are applicable to a wide range of applications.

Normally the collagen film leaves the dryer very brittle (because of the very low water content). The fresh collagen film is difficult to handle. This very dry film shows a high affinity to water. The uptake of water and humidity is fast and difficult to control. For the customer, the quickly water-absorbing collagen film is difficult to control. Collagen film not immediately used takes up a high amount of water in humid air. A sticky foil can be the result, which is very difficult to handle in the machines. After some days, microbiological growth on the foil also can be a problem.

The incorporated residual natural fat makes the present product stable against variation of humidity. The collagen foil leaves the dryer with preferably 11–13% residual water content. Even under humid air conditions this water content is stable and increases at most to a stable maximum of about 15%.

The porcine collagen fibers are much thinner than the bovine fibers. The resulting porcine foil is a much more compact woven material. This positively influences some important properties in the use as a wrap for e.g., oxygen permeability and the humidity permeability. The normal oxygen permeability is about 1000–2000 ml/m² d bar, whereas the present invention is in a range of 200–500. The normal humidity permeability is also about 1000–2000 g/m² d bar, whereas the present invention is in a range of 100–300. With the present invention, non-smoked products are better protected against chemical oxidation and loss of water.

The present invention can be utilized for wrapping hams where a collagen film is transformed into a tube and the ham is placed inside the tube. Thereafter a net is wrapped around the ham. The present invention also acts as a barrier membrane to reduce the loss of water of cooked ham and roast. The present invention also allows easy removal of the net.

The present invention can be utilized for the production of smoked ham, cooked salted meat articles, roast, scalded sausage, other sausages, fish products and pastry. The barrier membrane of the invention protects against water loss, loss of fat, etc.

EXAMPLE 2

Step I: (Pretreatment)

In a first step the rinds are washed with a surfactant.

In a specific non-limiting example, this pretreatment can be carried out as follows (i.e., it should be understood that this is an exemplary embodiment and can be varied by those in the art depending on circumstances as appropriate (most preferable values in parenthesis):

| Temperature: 10–25° C. (20° C.) | | | |
|---|---|---|---|
| (i) | Place the following into the mixer | | |
| | Rinds | 100% | |
| | Water | 50–200% | (100%) |
| | Surfactant | 0.2–3% | (1%) |
| (ii) | Treatment time in the mixer: | 30 min.–4 h | (1 hour) |
| (iii) | Rinse: | | |
| | Drain the water and dissolved chemicals from the mixer. | | |

Step II: (Alkalinic Treatment/Dehairing (i.e., the Removal of the Porcine Bristles))

In a second step, hair (e.g., roots within the skin) is removed from the porcine rinds. The presence of this hair is a problem particular to porcine skins. In this "hair-removal" step, a combination of chemicals, which preferably includes sodium sulfide, is used to dissolve this undesired hair or bristle materials. This step and the advantages therefrom are also unknown in the prior art field of edible foils. Normally this dehairing step of bovine skins take place in tanneries under technical conditions. As noted above the use of the sulfide dehairing of porcine rinds under foodstuff conditions is novel.

In a specific non-limiting example, this dehairing can be carried out as follows (most preferable values in parenthesis):

| Temperature: 10–25° C. (20° C.) | | | |
|---|---|---|---|
| pH > 9 (>12) | | | |
| (i) | Place in mixer: | | |
| | Lime | 0.5–5% | (3%) |
| | Water | 20–50% | (30%) |
| | Sodium sulfide | 2–6% | (4%) |
| (ii) | Treatment time in mixer: | 2–8 h | (5 hours) |
| (iii) | Add in mixer: | | |
| | Water | rest to 100% | (70%) |
| (iv) | Treatment time in mixer: | 5–30 min. | (10 minutes) |
| (v) | Rinse: | | |
| | Drain the water and dissolved chemicals from the mixer. | | |

Step III: (Washing)

Then, the porcine skins are preferably subjected to a washing step. In a specific non-limiting example, the washing step can be carried out as follows (most preferable values in parenthesis):

| Temperature: 10–35° C. (30° C.) | | | |
|---|---|---|---|
| (i) | Place in mixer: | | |
| | Water | 50–200% | (100%) |
| (ii) | Treatment time in mixer: | 5–30 min. | (10 minutes) |
| (iii) | Rinse: | | |
| | Drain the water and dissolve chemical from the mixer. | | |

Step IV: (Defatting)

In this defatting step the rinds are defatted. This defatting step is preferably carried out enzymatically with the help of wetting agents (e.g., detergents). Preferably lipases are used to hydrolyze natural fat between the collagen fibers. In addition, proteases are preferably used to support this action (i.e., to provide a more uniform defatting). In addition, a surfactant is preferably used to emulsify the released fatty acids. This first step, including the combination of chemicals and biochemical agents therein, and the advantages therefrom were not previously contemplated in the field of preparing edible foils.

In a specific non-limiting example, this defatting can be carried out as follows (i.e., it should be understood that this is an exemplary embodiment and can be varied by those in the art depending on circumstances as appropriate). (most preferable values in parenthesis):

| Temperature: 10–35° C. (30° C.) | | | |
|---|---|---|---|
| pH 8–13 (9–11) | | | |
| (i) | Place the following into the mixer | | |
| | Water | 50–200% | (100%) |
| | Fat dissolving enzymes (lipases) | 0–2% | (0.6%) |
| (ii) | Treatment time in the mixer: | 15 min.–6 h | (1 hour) |
| (iii) | Add to the above in the mixer: | | |
| | Protein dissolving enzymes (proteases) | 0–2% | (0.5%) |
| | Surfactant | 0.05–3% | (0.5%) |
| (iv) | Treatment time in the mixer: | 1–12 h | (4 hour) |
| (v) | Rinse: | | |
| | Drain the water and dissolved chemicals from the mixer. | | |

Step V: (Further Washing)

Then, the porcine skins are preferably subjected to further washing step. In as specific non-limiting example, the further washing step can be carried out as follows (most preferable values in parenthesis):

| Temperature: 10–35° C. (30° C.) | | | |
|---|---|---|---|
| (i) | Place in mixer: | | |
| | Water | 50–200% | (100%) |
| (ii) | Treatment time mixer: | 5–40 min | (20 minutes) |
| (iii) | Rinse: | | |
| | Drain the water and dissolved chemicals from the mixer. | | |
| (iv) | Place in mixer: | | |
| | Water | 50–200% | (100%) |
| (v) | Treatment time in mixer: | 5–40 min. | (20 minutes) |
| (vi) | Rinse: | | |
| | Drain the water and dissolved chemicals from the mixer. | | |

Step VI: (Neutralization)

Then, following defatting, a neutralization is conducted. In this step, the rinds in a specific non-limiting example, the acidification can be carried out as follows (most preferable values in parenthesis):

| Temperature: 10–35° C. (30° C.) | | | |
|---|---|---|---|
| pH max. 3.5 | | | |
| (i) | Place in mixer: | | |
| | Water | 50–200% | (100%) |
| | citric acid | 0.5–2% | (1%) |
| (ii) | Treatment time in mixer: | 2–5 h | (3 hours) |
| (iii) | Rinse: | | |
| | Drain the water and dissolved chemicals from the mixer. | | |
| (iv) | Place in mixer: | | |
| | Water | 50–200% | (100%) |
| | mono sodiumcitrate | 0.5–5% | (2%) |
| (v) | Treatment time in mixer: | 2–5 h | (3 hours) |
| Adjusting the pH with hydrochloric acid (10%): | | | |
| (vi) | Add to the above in the mixer | | |
| | hydrochloric acid (10% | 0.2–2% | (1%) |
| (vii) | Treatment time in mixer | 30 min.–5 h | (2 hours) |
| Repeat steps (vi)–(vii) until pH about 5 is reached | | | |
| (viii) | The mixer stand over night | | |
| (ix) | Rinse: | | |
| | Drain the water and dissolved chemicals from the mixer. | | |

Step VII: (Additional Washing)

In a specific non-limiting example, the additional washing step can be carried out as follows (most preferable values in parenthesis):

| Temperature: 10–35° C. (30° C.) | | | |
|---|---|---|---|
| (i) | Place in mixer: | | |
| | Water | 50–200% | (100%) |
| (ii) | Treatment time in mixer: | 5–40 min. | (20 minutes) |
| (iii) | Rinse: | | |
| | Drain the water and dissolved chemicals from the mixer. | | |

The material is ground into a collagen slurry which is then acidificated into a gel-like mass.

Step VII (Grinding)

As in Example 1.

Step IX (Milling)

The ground material is mixed with 5 parts water and 3 parts ice. Milling in a colloid mill to a uniform collagen slurry.

Step X (Mass Preparation)

In a further step, the slurry is preferably mixed again with water, ice, hydrochloric acid and softener to a uniform gel-like mass.

In one exemplary non-limiting case, the values of the mixed mass can be about:

| Collagen content: | 1–2.5% | (1.8%) |
|---|---|---|
| Glycerol | 0–1.2% | (0.6%) |
| pH: | 2–3.6 | (2.8) |
| Temperature: | 3–18° C. | (8° C.) |

While the present invention has been shown and described with reference to preferred embodiments presently contemplated as best modes for carrying out the invention, it is understood that various changes may be made in adapting the invention to different embodiments without departing from the broader inventive concepts disclosed herein and comprehended by the claims which follow.

What is claimed is:

1. A collagen membrane comprising an edible sheet containing collagen derived from defatted, chemically dehaired and acidicly hydrolyzed porcine rind material, said collagen membrane formed without use of crosslinking agents, said collagen membrane being formed by a method comprising steps of:

a) defatting porcine rind material to remove a majority of fat from the rind material;
   b) chemically dehairing the rind material;
   c) performing an acidic hydrolyzation on the rind material;
   d) reducing the rind material into a gel-like mass of rind material containing collagen; and
   e) extruding, sheeting and drying the gel-like mass into a collagen membrane, without use of crosslinking agents, which membrane is suitable for wrapping around a food product.

2. The collagen membrane of claim 1, wrapped around a food product.

3. The collagen membrane of claim 2, wherein the food product is ham.

4. The collagen membrane of claim 1, having a moisture content within the range of about 5–25%.

5. The collagen membrane of claim 1, having a thickness in the range of about 0.01–2 mm.

* * * * *